July 7, 1959  S. E. SZASZ  2,894,200
SUBTERRANEAN INTERFACE LOCATOR

Filed Oct. 26, 1956  2 Sheets-Sheet 1

INVENTOR
STEFAN E. SZASZ

ATTORNEY

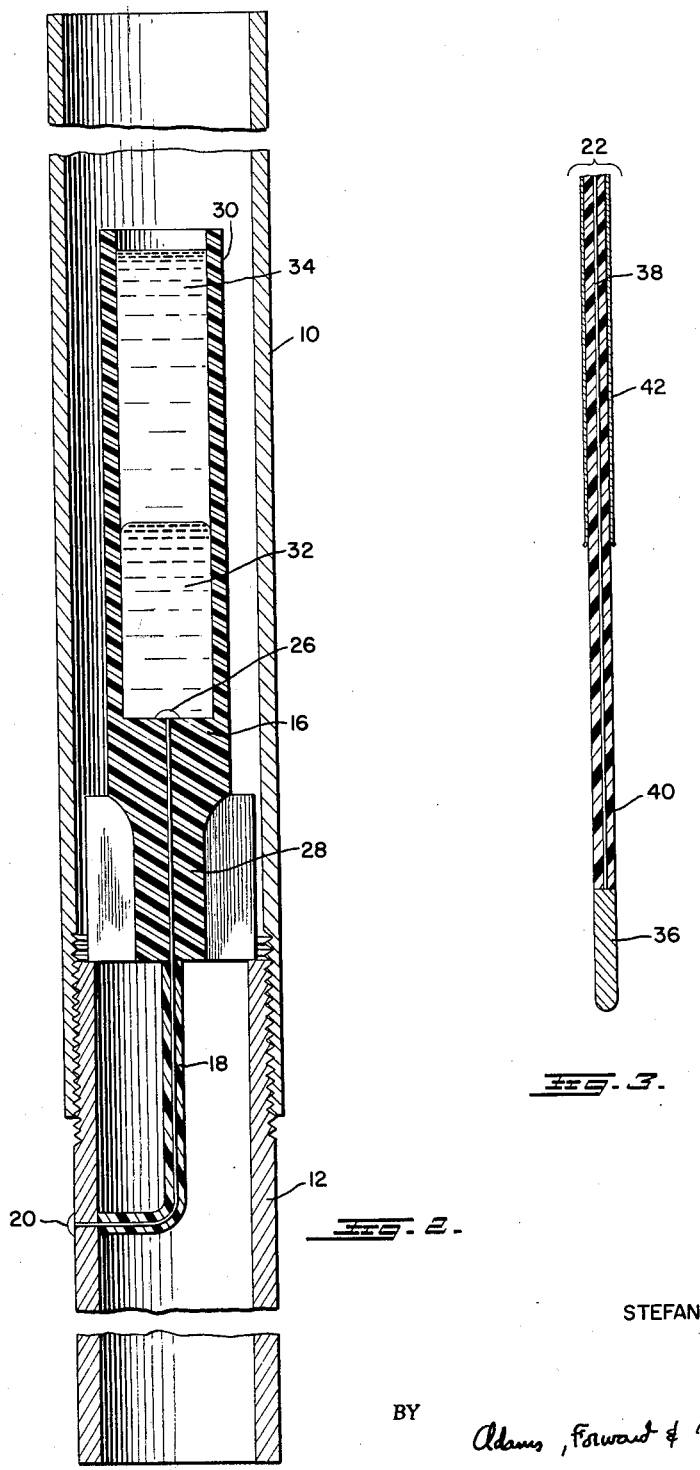

United States Patent Office 2,894,200
Patented July 7, 1959

2,894,200

SUBTERRANEAN INTERFACE LOCATOR

Stefan E. Szasz, Tulsa, Okla., assignor to Sinclair Oil & Gas Company, Tulsa, Okla., a corporation of Maine Application October 26, 1956, Serial No. 618,583

9 Claims. (Cl. 324—10)

This invention relates to apparatus adapted for use in subterranean passages such as oil wells, water wells and the like. In particular, the present invention relates to an apparatus adapted to provide continuity of an electrical circuit extending from the earth's surface through the inside of a tubing string a distance down the bore hole, to the wall of the tubing and thence to the surface of the earth so that electrical measurements can be made in the bore hole.

Certain operations in the production of fluids such as oil from subterranean passages involve passing a plurality of fluids having different characteristics into the well bore. Instances of such operations include processes known as injection profiling and selective acidization. Essentially these processes involve basically similar manipulative steps and the apparatus employed can be substantially identical in each case. In general, in such a process two fluids are passed into the well bore in a manner such that an interface forms between the fluids. For adequate control of the process being effected it is essential that the location of such an interface be known. For example, in the event that injection rate is being determined, since fluids passing into the formation cannot be measured directly, a differential measurement can be obtained by measuring the quantities and/or flow rates of the fluids introduced which are necessary to maintain the interface at a given point.

Apparatus for effecting these processes is known and is evidenced in the patent art, for example, by the Barstow Patent No 2,347,589, the Silverman Patent No. 2,524,933 and the Holbert application, Serial No. 522,705, filed July 18, 1955, Patent No. 2,776,563. An important condition in utilizing apparatus of the type described in the above patents is that at least one of the electrodes be connected with the above ground conductivity measuring apparatus through an insulated electrical path. Electrical leakage along this path can be tolerated only if the two fluids have a relatively high electrical resistance differential, a condition which is impractical if not impossible to realize in the field especially when the two fluids are water and a brine solution. The present invention relates in particular to an apparatus adapted to indicate in an advantageous manner an interface in a well bore, especially where profiling or acidizing is being practiced.

I have now devised an apparatus especially adapted for determining the location of or following the movement of an interface in a well bore at a distance removed from the earth's surface. My apparatus is characterized by the fact that it provides a connector which will establish an electrical contact between the lower end of a conducting cable and one of the electrodes of a conductivity or potential cell in such a way that the electrical path between this electrode and the resistivity or potential measuring apparatus above ground is insulated. My device is also characterized by the fact that this contact is established merely by lowering an electrical conductor into the injection string. The device is further advantageous in that it provides a means for checking the electrical path from the electrode to the above ground resistivity measuring equipment at any time after the conducting cable has been lowered into the well.

In my invention, a fluid receiving tube or "socket" is housed in a brine injection tubing which may be composed of an upper electrically conducting portion and a lower electrically non-conducting portion. The "socket" is a tube of insulating material, closed at the lower end and having an electrically-conducting contact disposed on or near its bottom, said contact being connected by an insulated wire to an electrode on the outside of the non-conducting portion of the brine injection tubing. The contact is covered with a pool of electrically conducting fluid such as mercury and on top of the pool of conducting fluid is a layer of electrically non-conducting fluid such as carbon tetrachloride, or any non-conducting fluid heavier than brine. The supporting structure for the socket unit advantageously comprises a star or crossbar construction so that a continuous cross-sectional area is not encountered by fluids within the tubing.

A second part of my apparatus which is lowered into the socket, comprises an electrical conductor which may have a stainless metal, e.g. steel, contact piece soldered, brazed or otherwise connected to its lower end. Above the contact piece, the wire can be insulated with any suitable material for instance a plastic such as "Teflon," which is resistant to the non-conducting fluid. A protecting sheath of metallic, e.g. stranded steel wire, or other material may surround the plastic sheath.

The invention will be described further in conjunction with the appended drawings in which:

Figure 2 is a cross-sectional view of a tubing section with the socket unit mounted thereon; and Figure 3 is an embodiment showing the cable contacting unit in cross-section.

Figure 1:
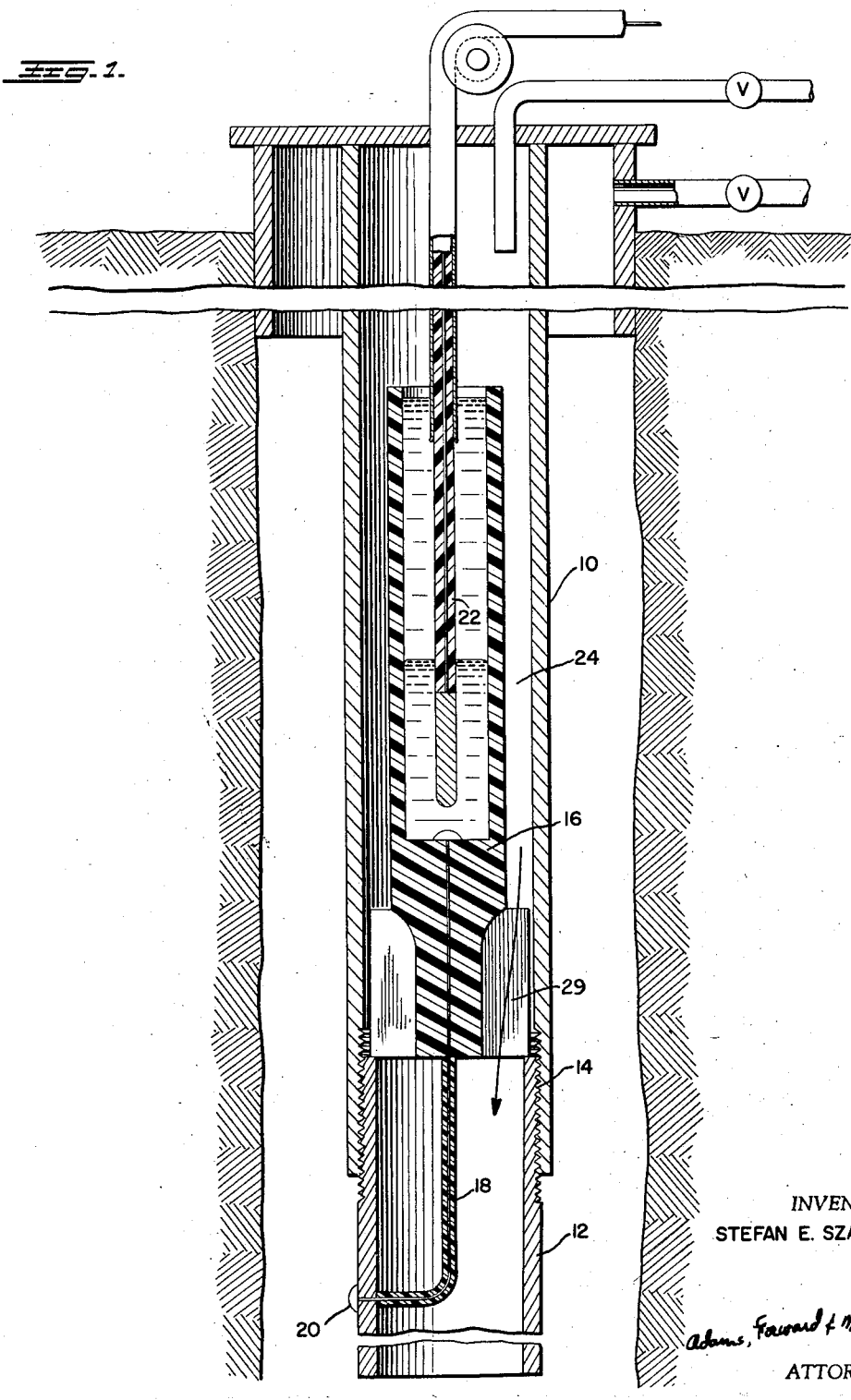
Figure 1 represents a vertical view, partly in section, of an embodiment of the apparatus with the cable disposed in closed circuit position in a well.

Referring now to Figure 1, the numeral 10 represents an electrically conducting tubing string provided with a lower extension 12 composed of a non-conducting material. The tubing section is disposed in a cased well bore which grounds the tubing string. If desired, the tubing section can be composed of two portions threadedly engaged as at 14. Mounted within tubing section 10 is unit 16 referred to as the socket, having an insulated conductor 18 extending downwardly and terminating at electrode 20. Removably extending into the socket unit 16 is the second unit 22 which passes from the earth's surface. The size of the socket 16 is such as to provide an annular space 24 about the socket 16 within the tubing section 10 so that fluids can freely pass through.

Referring in particular to Fgure 2, showing the socket unit 16 disposed within tubing section 10, the socket unit 16 is composed of an insulated electrical conductor 18 communicating at one of its ends with electrode 20 and disposed in the form of a contact 26 at its other end. The electrode 20 is a portion of electrical conducting material disposed on or embedded in the outside surface of the non-conducting portion 12 of the tubing section 10 in a manner such that it does not communicate with the fluids within the tubing section 10. The contact 26 is disposed at the bottom of the fluid-receiving portion of socket 16. Socket 16 is further composed of an insulated base 28 supported and mounted within tubing section 10 by supporting means 29. Advantageously, supporting means 29 can take form in cross-section of a spider or star arrangement so that fluid can freely pass through the tubing while the socket 16 is in place. The upper portion of socket 16 is formed in such a manner that fluids may be held therein. In the embodiment illustrated this takes the form of a cylindrical tube 30. The contact 26 disposed on the base 28 of socket 16 is covered with a pool of conducting fluid 32 such as mercury and on top of the mercury 32 is a layer of non-conducting fluid 34 such as carbon tetrachloride, both of the fluids being contained in the cylindrical tube 30.

Referring now to Figure 3 showing the second unit 22 of my invention, this unit being composed of a stainless steel contact piece 36 soldered or brazed to the inner wire conductor 38 of the unit 22. Above the stainless steel contact piece 36 the conductor wire 38 is insulated with a plastic 40 which is resistant to the non-conducting fluid 34. The outside of the stringer 22 is protected by material such as stranded steel wire 42, the outer protective covering being stripped back for such a length as to prevent contact between it and the pool of mercury 32. The contact piece 36 is sized to be completely immersible in either the mercury or the carbon tetrachloride.

In operation, a tubing section such as 10 having a socket unit 16 mounted therein is connected in the tubing string which is electrically grounded. The tubing string is lowered into a well bore, such as one undergoing injection profiling. Salt water, for example, is pumped through the inside of the string, passing out of its bottom and filling the well bore to a point above the non-conducting portion of tubing string in the annular area defined by the tubing string and the adjacent well bore. Fresh water passed into the well bore at the earth's surface in the annular space between the well bore and the tubing string, contacts the brine and an interface forms between the two fluids opposite an exposed portion of the well bore.

At the earth's surface, a suitable source of current (not shown) provided with a voltage controlling means is connected to the conductor 38 of stringer unit 22 with the other terminal of the source being grounded. An ammeter or other current indicating device (not shown) is provided in the circuit between the source and the conductor. The stringer 22 is then lowered into the brine injection string. When the stainless steel contact piece 36 on the end of stringer 22 reaches the pool of mercury 32 and when a conducting fluid spans the gap between electrode 20 and tubing string 10, an electrical circuit across the conductivity cell is established as indicated by the above ground resistivity measuring apparatus. The insulation of the electrical path between the electrode and the resistivity meter may be checked at any time by raising the stringer 22 slightly. Thus, when the stainless steel contact piece 36 leaves the pool of mercury 32 and is completely covered by the layer of carbon tetrachloride 34, the ammeter above ground will show an open circuit, even though the injection string is completely filled with brine. It can be seen, therefore, from the above description of my invention that it would be impossible for any short circuiting to occur while my apparatus is in use since the movable contact which establishes the completed circuit is immersed in a conducting fluid having communication with the other contact or in a non-conducting fluid through which short circuiting to the other contact or to the ground would be impossible.

The location of the interface once the circuit has been established in the manner described may be accomplished by any of the well-known methods such as by suitable calibration of the circuit prior to placing the apparatus in the well bore. By this procedure relative movement of the interface at its location at any given instant may be readily determined by comparing the ammeter reading with the calibration data. By correlation of input rates of the fluid necessary to maintain the interface at a given point, the injectivity rate of the strata involved may be computed.

I claim:

1. An apparatus of the type described comprising a tubular member having an electrically non-conducting lower portion and an electrically conducting upper portion, an electrically non-conducting fluid receiving means mounted within the tubular member, an electrode disposed on the outside surface of the non-conducting portion of said tubular member, an electrical contact in the fluid receiving means which is in electrical communication with said electrode and electrically insulated from the bore of the tubular member, an electrically conducting fluid disposed in said fluid receiving means, said contact being contacted by said conducting fluid, an electrically non-conducting fluid disposed on said conducting fluid in said fluid receiving means, and an electrical conductor extending through said non-conducting fluid, said conductor being in electrical contact with said conducting fluid and being covered by electrical insulation in the portion positioned above said non-conducting fluid which prevents electrical contact between said conducting fluid and the bore of the tubular member.

2. The apparatus of claim 1 in which the conducting fluid is mercury and the non-conducting fluid is carbon tetrachloride.

3. An apparatus of the type described comprising a grounded tubing string positioned in a well bore and having an electrically non-conducting lower portion and an electrically conducting upper portion, an electrically non-conducting fluid receiving means mounted within the tubing string, an electrode disposed on the outside surface of the non-conducting portion of said tubing string, an electrical contact in the fluid receiving means which is in electrical communication with said electrode and electrically insulated from the bore of the tubing string, an electrically conducting fluid disposed in said fluid receiving means, said contact being contacted by said conducting fluid, an electrically non-conducting fluid disposed on said conducting fluid in said fluid receiving means, and an electrical conductor extending through said non-conducting fluid, said conductor being in electrical contact with said conducting fluid and being covered by electrical insulation in the portion positioned above said non-conducting fluid, which insulation prevents electrical contact between said conducting fluid and the bore of the tubing string.

4. The apparatus of claim 3 in which the conducting fluid is mercury and the non-conducting fluid is carbon tetrachloride.

5. An apparatus of the type described comprising a tubular member having an electrically non-conducting lower portion and an electrically conducting upper portion, an electrically non-conducting fluid receiving means mounted within the tubular member, an electrode disposed on the outside surface of the non-conducting portion of said tubular member, an electrical contact in the fluid receiving means which is in electrical communication with said electrode and electrically insulated from the bore of the tubular member, an electrically conducting fluid disposed in said fluid receiving means, said contact being contacted by said conducting fluid, an electrically non-conducting fluid disposed on said conducting fluid in said fluid receiving means, and an electrical conductor extending through said non-conducting fluid, said conductor being in electrical contact with said conducting fluid and being covered by electrical insulation in the portion positioned about said non-conducting fluid, which insulation prevents electrical contact between said conducting fluid and the bore of the tubular member and said conductor having a stainless metallic piece on its lower end to provide its electrical contact with the conducting fluid which piece is sized to be entirely covered by said non-conducting fluid when the piece is withdrawn from contact with the conducting fluid.

6. The apparatus of claim 5 in which the conducting fluid is mercury and the non-conducting fluid is carbon tetrachloride.

7. The apparatus of claim 5 in which the tubular member is positioned and grounded to a cased well bore.

8. The apparatus of claim 7 in which a protective plastic sheath surrounds the portion of the conductor in the non-conducting fluid and a metallic protective sheath surrounds the portion of the conductor extending above said non-conducting fluid, said metallic sheath ending sufficiently above the lower end of the conductor to prevent contact of the sheath with the conducting fluid.

9. The apparatus of claim 8 in which the conducting fluid is mercury and the non-conducting fluid is carbon tetrachloride.

References Cited in the file of this patent

UNITED STATES PATENTS

| | | |
|---|---|---|
| 2,347,589 | Barstow | Apr. 25, 1944 |
| 2,376,878 | Lehnhard | May 29, 1945 |
| 2,524,933 | Silverman | Oct. 10, 1950 |
| 2,581,979 | Stading | Jan. 8, 1952 |
| 2,776,563 | Holbert | Jan. 8, 1957 |

UNITED STATES PATENT OFFICE

CERTIFICATE OF CORRECTION

Patent No. 2,894,200                                                                  July 7, 1959

Stephan E. Szasz

It is hereby certified that error appears in the printed specification of the above numbered patent requiring correction and that the said Letters Patent should read as corrected below.

Column 4, line 64, for "about" read -- above --.

Signed and sealed this 29th day of March 1960.

(SEAL)
Attest:

KARL H. AXLINE                                                     ROBERT C. WATSON
Attesting Officer                                          Commissioner of Patents